United States Patent
Robinson et al.

(10) Patent No.: US 10,054,037 B2
(45) Date of Patent: Aug. 21, 2018

(54) MULTI-STAGE TURBOCHARGER SYSTEM WITH BYPASS FLOWPATHS AND FLOW CONTROL VALVE

(71) Applicant: Cummins Turbo Technologies Limited, Huddersfield (GB)

(72) Inventors: Lee J. Robinson, West Yorkshire (GB); Daniel M. Acker, Greenwood, IN (US)

(73) Assignee: Cummins Turbo Technologies Limited, Huddersfield (GB)

( * ) Notice: Subject to any disclaimer, the term of this patent is extended or adjusted under 35 U.S.C. 154(b) by 431 days.

(21) Appl. No.: 14/814,832

(22) Filed: Jul. 31, 2015

(65) Prior Publication Data

US 2015/0337717 A1 Nov. 26, 2015

Related U.S. Application Data

(63) Continuation-in-part of application No. 14/746,166, filed on Jun. 22, 2015, which is a continuation of
(Continued)

(30) Foreign Application Priority Data

Nov. 21, 2009 (GB) .................................. 0920437.1

(51) Int. Cl.
*F02B 37/18* (2006.01)
*F02D 9/16* (2006.01)
(Continued)

(52) U.S. Cl.
CPC .......... *F02B 37/004* (2013.01); *F02B 37/013* (2013.01); *F02B 37/16* (2013.01);
(Continued)

(58) Field of Classification Search
CPC ................... F02B 37/004; F02B 37/013; F02B 37/18–37/186; F02M 26/08; Y02T 10/144
(Continued)

(56) References Cited

U.S. PATENT DOCUMENTS 3,370,612 A 2/1968 Holl
4,930,315 A 6/1990 Kanesaka
(Continued)

FOREIGN PATENT DOCUMENTS

DE 3735736 5/1989
DE 19514572 10/1996
(Continued)

OTHER PUBLICATIONS

United Kingdom Search Report GB0920437.1 Cummins Turbo Technologies Limited, dated Mar. 7, 2011.

*Primary Examiner* — Laert Dounis
(74) *Attorney, Agent, or Firm* — Taft Stettinius & Hollister LLP

(57) ABSTRACT

A turbocharger system comprises a first relatively small high-pressure (HP) turbocharger and a second relatively large low pressure (LP) turbocharger. The turbine of the LP turbocharger is connected in series downstream of the turbine of the HP turbocharger. A first exhaust bypass flow passage provides a bypass flow path around the HP turbine. A second exhaust bypass flow passage provides a bypass flow path around the LP turbine. A rotary valve is located at a junction of the first and second bypass flow passages and a first exhaust gas flow passage. The rotary valve comprises a valve rotor which is rotatable selectively to permit or block flow to the LP turbine and to permit or block flow to the first and second bypass paths.

16 Claims, 8 Drawing Sheets

Related U.S. Application Data application No. 12/951,400, filed on Nov. 22, 2010, now Pat. No. 9,062,594.

(51) Int. Cl.

| | | |
|---|---|---|
| *F02B 37/00* | (2006.01) | |
| *F02B 37/013* | (2006.01) | |
| *F02B 37/16* | (2006.01) | |
| *F02D 9/06* | (2006.01) | |
| *F02M 26/08* | (2016.01) | |

(52) U.S. Cl.
CPC ............ *F02B 37/18* (2013.01); *F02B 37/183* (2013.01); *F02D 9/06* (2013.01); *F02D 9/16* (2013.01); *F02M 26/08* (2016.02); *Y02T 10/144* (2013.01)

(58) Field of Classification Search
USPC ........................................................ 60/612
See application file for complete search history.

(56) References Cited

U.S. PATENT DOCUMENTS

| | | | |
|---|---|---|---|
| 5,142,866 A | 9/1992 | Yanagihira | |
| 5,408,979 A | 4/1995 | Backlund et al. | |
| 5,529,026 A | 6/1996 | Kurr et al. | |
| 5,893,392 A | 4/1999 | Spies et al. | |
| 6,220,487 B1 | 4/2001 | Srivastava et al. | |
| 6,237,587 B1 | 5/2001 | Ausman et al. | |
| 6,298,868 B1 | 10/2001 | Dean et al. | |
| 6,378,308 B1 | 4/2002 | Pfluger | |
| 6,378,509 B1 | 4/2002 | Feucht et al. | |
| 6,688,333 B2 | 2/2004 | McLane | |
| 6,802,184 B2 | 10/2004 | Hunter et al. | |
| 6,923,211 B2 | 8/2005 | McLane | |
| 6,976,505 B2 | 12/2005 | Maclane | |
| 7,051,527 B2 | 5/2006 | Schmid | |
| 7,165,403 B2 | 1/2007 | Sun et al. | |
| 7,255,129 B2 | 8/2007 | Lopez | |
| 7,347,048 B2 | 3/2008 | Albat | |
| 7,963,951 B2 | 6/2011 | Kitani et al. | |
| 7,894,730 B2 | 7/2011 | Ziv et al. | |
| 7,984,730 B2 | 7/2011 | Ziv et al. | |
| 8,011,186 B2 | 9/2011 | McEwan et al. | |
| 8,235,709 B2 | 8/2012 | Meagher et al. | |
| 9,062,594 B2 | 6/2015 | Robinson | |
| 2003/0074899 A1 | 4/2003 | Yamaguchi | |
| 2003/0121553 A1 | 7/2003 | Kuo Liao | |
| 2003/0188535 A1 | 10/2003 | Mader et al. | |
| 2004/0040300 A1 | 3/2004 | Klingel | |
| 2004/0134193 A1 | 7/2004 | Klingel | |
| 2006/0042247 A1 | 3/2006 | Haugen | |
| 2006/0070381 A1 | 4/2006 | Parlow | |
| 2006/0174620 A1 | 8/2006 | Albat | |
| 2007/0181185 A1 | 8/2007 | Clark | |
| 2012/0048411 A1 | 3/2012 | Steyer et al. | |
| 2012/0240572 A1 | 9/2012 | Schorn et al. | |
| 2015/0337717 A1 | 11/2015 | Robinson | |
| 2017/0101925 A1 | 4/2017 | Robinson | |

FOREIGN PATENT DOCUMENTS

| | | |
|---|---|---|
| DE | 19740609 | 12/1998 |
| DE | 10222919 | 12/2003 |
| DE | 102005025885 | 12/2006 |
| DE | 10222919 | 12/2007 |
| EP | 0864737 | 9/1998 |
| EP | 0949411 | 10/1999 |
| EP | 1258603 | 11/2002 |
| EP | 1375868 | 1/2004 |
| EP | 2080876 | 7/2009 |
| EP | 2080876 | 6/2010 |
| JP | 61200331 | 9/1986 |
| JP | 62265442 | 11/1987 |
| JP | 63009616 | 1/1988 |
| JP | 2005315163 | 11/2005 |
| JP | 2007154684 | 12/2005 |
| WO | 20047042206 | 5/2004 |
| WO | 2006089653 | 8/2006 |
| WO | 2007031752 | 3/2007 |
| WO | 2007098133 | 8/2007 |
| WO | 2008015397 | 2/2008 |
| WO | 2008015400 | 2/2008 |
| WO | 2009030914 | 3/2009 |

MULTI-STAGE TURBOCHARGER SYSTEM WITH BYPASS FLOWPATHS AND FLOW CONTROL VALVE

CROSS REFERENCE

The present application is a continuation-in-part of U.S. patent application Ser. No. 14/746,166 filed on Jun. 22, 2015, which is a continuation of U.S. patent application Ser. No. 12/951,400 filed on Nov. 22, 2010 and issued as U.S. Pat. No. 9,062,594 on Jun. 23, 2015, which claims priority to United Kingdom Patent Application No. 0920437.1 filed Nov. 21, 2009. The disclosure of each of the foregoing applications is hereby incorporated by reference.

BACKGROUND

The present invention relates to a multi-stage turbocharger system. Particularly, but not exclusively, the present invention relates to a two-stage turbocharger system and a method for operating the same.

Turbochargers are well known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housings.

In known turbochargers, the turbine stage comprises a turbine chamber within which the turbine wheel is mounted; an annular inlet passageway defined between facing radial walls arranged around the turbine chamber; an inlet arranged around the inlet passageway; and an outlet passageway extending from the turbine chamber. The passageways and chambers communicate such that pressurised exhaust gas admitted to the inlet chamber flows through the inlet passageway to the outlet passageway via the turbine and rotates the turbine wheel. It is also known to improve turbine performance by providing vanes, referred to as nozzle vanes, in the inlet passageway so as to deflect gas flowing through the inlet passageway towards the direction of rotation of the turbine wheel.

Another known approach to improving turbocharging efficiency for an engine with a wide speed/load range is to provide a sequential two stage turbocharging system, comprising one relatively small high pressure (HP) turbocharger and another relatively large low pressure (LP) turbocharger. The turbochargers are arranged in series so that exhaust from the engine flows first through the smaller turbine of the HP turbocharger and then through the larger turbine of the LP turbocharger. A valve-controlled bypass path is provided for allowing exhaust gas to bypass the HP turbine for instance at high engine speeds and/or loads. Similarly, the compressors of the two turbochargers are also arranged in series, with air flowing first through the relatively large compressor of the LP turbocharger and then through the relatively small compressor of the HP turbocharger. Again, a valve controlled bypass is provided to allow the inlet air to bypass the compressor of the HP turbocharger for instance at high engine speeds and/or loads.

In a sequential two-stage turbocharging system disclosed in WO 2008/015400, exhaust gas flow through the HP turbine, LP turbine and HP bypass path is controlled by a single rotary valve which may be positioned upstream or downstream of the HP turbine. In more detail, a primary exhaust gas flow path comprises an inlet portion which delivers exhaust gas to the HP turbine and an intermediate portion which delivers exhaust gas from the HP turbine to the LP turbine. The bypass path communicates between the inlet portion of the primary flow path and the intermediate portion of the primary flow path. The exhaust gas flow control valve is a rotary valve located at a junction of the bypass path and the primary path (which may be the inlet portion of the primary path if the valve is upstream of the HP turbine, or the intermediate portion of the primary path if the valve is downstream of the HP turbine). The rotary valve comprises a valve rotator rotating in a valve chamber and operable to permit or block flow through the bypass path and/or the primary path that is again either the inlet or intermediate portions of the primary path depending on whether the valve is upstream or downstream of the HP turbine respectively. In one embodiment in which the valve is upstream of the HP turbine, the valve comprises an inlet port communicating with the inlet portion of the primary flow path, a primary outlet port communicating with the inlet portion of the primary flow path (so that flow to the HP turbine flows through the valve via the inlet port and primary outlet port), and a bypass port which provides an outlet to the bypass path which communicates with the inlet of the LP turbine (which may be via the intermediate portion of the primary flow path). In another embodiment in which the valve is downstream of the HP turbine, the valve comprises a primary inlet port communicating with the intermediate portion of the primary flow path, and a primary outlet port communicating with the LP turbine inlets (via the intermediate portion of the primary flow path), and a bypass inlet port communicating with the by pass path.

By rotation of the valve rotor to open, close or partially open/close individual ports the turbocharger system may be operated in various modes including a normal fired mode for modulating the exhaust gas flow to the HP and LP turbines, a braking mode (non-fired mode) in which the valve is operated to provide a braking back pressure in the exhaust system, and an exhaust gas heating mode (fired operating mode) in which the valve is operated to restrict exhaust gas flow to thereby heat the exhaust gas flow.

Embodiments of the sequential turbocharger system of WO 2008/015400 may include a wastegated LP turbine. The skilled person will appreciate that a wastegate is a valve controlled bypass flow path around the turbine.

SUMMARY

One embodiment is a turbocharger system comprising: a primary inlet for flow communication with an exhaust gas manifold of an engine and an exhaust outlet; a first relatively small turbocharger having a first turbine with an inlet and an outlet; a second relatively large turbocharger having a second turbine with an inlet and an outlet; a primary exhaust gas flow path including an inlet portion for delivering exhaust gas to the inlet of the first turbine and an intermediate portion for delivering exhaust gas from the outlet of the first turbine to the inlet of the second turbine; a first bypass flow path in gas flow communication with the primary inlet and the inlet of the second turbine thereby bypassing the first turbine; a second bypass flow path in gas flow communication with the primary inlet and the exhaust outlet thereby bypassing the second turbine; and an exhaust gas flow control valve operable to: i) permit or prevent selectively exhaust gas flow through the primary exhaust flow path; ii) permit or prevent selectively exhaust gas flow through the first bypass path; iii) permit or prevent selectively exhaust gas flow through the second bypass path; wherein the exhaust flow control valve is situated in the inlet portion of the primary exhaust gas flow path so as to permit or allow gas flow through the primary flow path by permitting or allowing gas flow through the inlet portion of the primary flow path; wherein the exhaust gas flow control valve comprises a primary inlet port communicating with the primary inlet; a primary outlet port communicating with the inlet portion of the primary flow path; a first bypass outlet port communicating with the first bypass path; and a second bypass outlet port communicating with the second bypass path; and wherein a recess is provided in a wall which extends between two of the outlet ports. In certain forms the wall extends between the first bypass outlet port and the second bypass outlet port. In certain forms the recess is provided at a central portion of the wall. In certain forms the recess has a depth of at least 0.25 mm. In certain forms the recess has a flat bottom surface. In certain forms the recess has straight edges cut at an angle.

Another embodiment is a turbocharger system comprising: a primary inlet for flow communication with an exhaust gas manifold of an engine and an exhaust outlet; a first relatively small turbocharger having a first turbine with an inlet and an outlet; a second relatively large turbocharger having a second turbine with an inlet and an outlet; a primary exhaust gas flow path including an inlet portion for delivering exhaust gas to the inlet of the first turbine and an intermediate portion for delivering exhaust gas from the outlet of the first turbine to the inlet of the second turbine; a first bypass flow path in gas flow communication with the primary inlet and the inlet of the second turbine thereby bypassing the first turbine; a second bypass flow path in gas flow communication with the primary inlet and the exhaust outlet thereby bypassing the second turbine; and an exhaust gas flow control valve comprising a valve rotor held in a valve chamber, the exhaust gas flow control valve being operable to: i) permit or prevent selectively exhaust gas flow through the primary exhaust flow path; ii) permit or prevent selectively exhaust gas flow through the first bypass path; iii) permit or prevent selectively exhaust gas flow through the second bypass path; wherein the exhaust flow control valve is situated in the inlet portion of the primary exhaust gas flow path so as to permit or allow gas flow through the primary flow path by permitting or allowing gas flow through the inlet portion of the primary flow path; wherein the exhaust gas flow control valve comprises a primary inlet port communicating with the primary inlet; a primary outlet port communicating with the inlet portion of the primary flow path; a first bypass outlet port communicating with the first bypass path; and a second bypass outlet port communicating with the second bypass path; and wherein the valve rotor is provided with a recess which extends circumferentially around a radially outer surface of the valve rotor, the recess being aligned with an end of at least one of the outlet ports. In certain forms the valve rotor is provided with a second recess which extends circumferentially around a radially outer surface of the valve rotor, the second recess being aligned with an opposite end of the at least one outlet port. In certain forms the recesses in the valve rotor are aligned with ends of the primary outlet port. In certain forms the recesses in the valve rotor are aligned with ends of the first bypass outlet port. In certain forms the recess has a depth of at least 0.1 mm. In certain forms the recess has a width of at least 1 mm. In certain forms one of the recesses is axially offset from a first cylindrical portion of the valve rotor. In certain forms one of the recesses partially overlaps with a second cylindrical portion of the valve rotor. In certain forms one of the recesses axially overlaps with a recess provided in a wall which extends between two of the outlet ports.

A further embodiment is a turbocharger system comprising: a primary inlet for flow communication with an exhaust gas manifold of an engine and an exhaust outlet; a first relatively small turbocharger having a first turbine with an inlet and an outlet; a second relatively large turbocharger having a second turbine with an inlet and an outlet; a primary exhaust gas flow path including an inlet portion for delivering exhaust gas to the inlet of the first turbine and an intermediate portion for delivering exhaust gas from the outlet of the first turbine to the inlet of the second turbine; a first bypass flow path in gas flow communication with the primary inlet and the inlet of the second turbine thereby bypassing the first turbine; a second bypass flow path in gas flow communication with the primary inlet and the exhaust outlet thereby bypassing the second turbine; and an exhaust gas flow control valve operable to: i) permit or prevent selectively exhaust gas flow through the primary exhaust flow path; ii) permit or prevent selectively exhaust gas flow through the first bypass path; iii) permit or prevent selectively exhaust gas flow through the second bypass path; wherein the exhaust flow control valve is situated in the inlet portion of the primary exhaust gas flow path so as to permit or allow gas flow through the primary flow path by permitting or allowing gas flow through the inlet portion of the primary flow path; wherein the exhaust gas flow control valve comprises a primary inlet port communicating with the primary inlet; a primary outlet port communicating with the inlet portion of the primary flow path; a first bypass outlet port communicating with the first bypass path; and a second bypass outlet port communicating with the second bypass path; and wherein there is no separation in the axial direction between the inlet port, the primary outlet port, first bypass port and the second bypass port.

Another embodiment is a system comprising: a primary inlet for flow communication with an exhaust gas manifold of an engine and an exhaust outlet; a first turbocharger having a first turbine with an inlet and an outlet; a second turbocharger having a second turbine with an inlet and an outlet, the second turbocharger being larger than the first turbocharger; a primary exhaust gas flow path including an inlet portion for delivering exhaust gas to the inlet of the first turbine and an intermediate portion for delivering exhaust gas from the outlet of the first turbine to the inlet of the second turbine; a first bypass flow path in gas flow communication with the primary inlet and the inlet of the second turbine thereby bypassing the first turbine; a second bypass flow path in gas flow communication with the primary inlet and the exhaust outlet thereby bypassing the second turbine; and an exhaust gas flow control valve operable to: selectively control exhaust gas flow through the primary exhaust flow path; selectively control exhaust gas flow through the first bypass path; selectively control exhaust gas flow through the second bypass path; wherein the exhaust flow control valve is situated in the inlet portion of the primary exhaust gas flow path so as to permit or allow gas flow through the primary flow path by permitting or allowing gas flow through the inlet portion of the primary flow path; and wherein the exhaust gas flow control valve comprises a primary inlet port communicating with the primary inlet; a primary outlet port communicating with the inlet portion of the primary flow path; a first bypass outlet port communicating with the first bypass path; and a second bypass outlet port communicating with the second bypass path. In certain forms the valve is operable in a first mode to block flow through the first and second bypass outlet ports, a second mode in which flow is permitted through the first bypass outlet port to allow at least a portion of the exhaust gas flow to bypass the first turbine alone, and a third mode in which flow is permitted through said second bypass outlet port to allow at least a portion of the exhaust gas flow to bypass both the first and second turbines. In certain forms the third mode exhaust gas flow is permitted through both the first and second bypass outlet ports. In certain forms when operating in said second mode the first bypass outlet port is at least partially unobstructed and the second bypass outlet port is fully obstructed.

Further embodiments, forms, objects, features, advantages, aspects, and benefits shall become apparent from the following description and drawings.

BRIEF DESCRIPTION OF THE FIGURES

Specific embodiments of the present invention will now be described, by way of example only, with reference to the accompanying drawings, in which.

DETAILED DESCRIPTION OF ILLUSTRATIVE EMBODIMENTS

Figure 1:
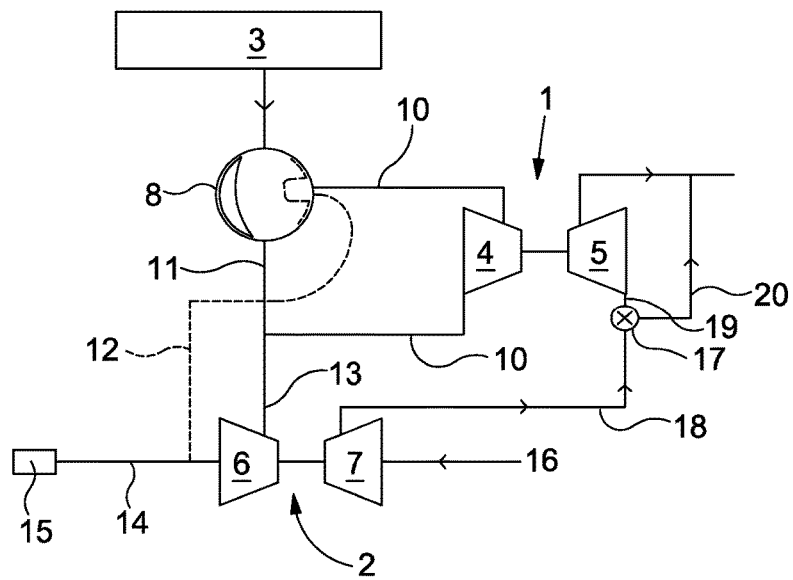
FIG. 1 is a schematic illustration of a two-stage turbocharging system according to a first embodiment of the present invention.

Referring first to FIG. 1, the schematically illustrated sequential two-stage turbocharging system comprises a relatively small high pressure (HP) turbocharger 1 and a relatively large low pressure (LP) turbocharger 2 connected in series to the exhaust manifold 3 of an internal combustion engine (not shown) such as a diesel engine. The HP turbocharger 1 comprises a relatively small exhaust turbine 4 and a relatively small compressor 5. The LP turbocharger 2 comprises a relatively large exhaust turbine 6 and a relatively large compressor 7.

An exhaust gas flow control valve 8 is located within the LP turbine housing 9 (see FIGS. 4-6) of the low pressure turbocharger 2 to control exhaust gas flow to the LP turbine inlet. The exhaust flow control valve 8 is operable to control flow exhaust gas flow from the manifold 3 via three possible flow paths 10, 11, 12. A first, primary, exhaust gas flow path 10 delivers exhaust gas from the exhaust manifold 3 to a LP turbine inlet path 13 via the HP turbine 4 and control valve 8. A first bypass flow path 11 delivers exhaust gas from the exhaust manifold 3 to the LP turbine inlet path 13 via valve 8 only, thus bypassing the HP turbine 4. A second bypass flow path 12 delivers exhaust gas from the exhaust manifold to an exhaust outlet path 14 of the LP turbine 6, thereby bypassing both the HP and LP turbines in a manner of a wastegate.

Exhaust gas (that leaves the LP turbine 6 or flows through the bypass flow path 12) in the exhaust outlet path 14 may be fed to a conventional exhaust system which may include a conventional exhaust after-treatment system 15. The after-treatment system 15 may be one of a variety of types of after-treatment system, including conventional systems generally known to one of ordinary skill in the art. Types of after-treatment systems contemplated include those designed to remove particulates, nitrogen-oxide compounds, and other regulated emissions.

As will be described in more detail below, the control valve 8 according to the present invention is operable to permit/block (and to modulate) exhaust gas flow to the LP inlet 13 from either the primary flow path 10 or the first bypass path 11. It is also operable to permit/block (and to modulate) exhaust gas flow to the LP turbine exhaust outlet path 14 via the second bypass path 12, thus allowing some or all of the exhaust gas to bypass both the HP turbine 4 and the LP turbine 6 in the manner of a wastegate.

The turbocharging system delivers compressed air to the engine (including any after cooler as appropriate) via an air inlet 16 to the LP compressor 7. An air flow control valve 17 is located between the compressor 7 of the LP turbocharger 2 and the compressor 5 of the HP turbocharger 1 to control the flow from the LP compressor outlet path 18 to the engine (after-cooler etc). The air flow control valve 17, which may for instance be a conventional butterfly valve (or other valve type such as a rotary valve, gate valve, flap valve, poppet etc), is operable to control air flow along two possible flow paths, a first flow path 19 via the HP compressor 5, and a second, bypass, flow path 20 which allows the air flow to bypass the HP compressor 5. The air flow control valve 17 can thus be controlled (for instance by the engine management system electronic control unit-ECU) to allow air flow to bypass the HP turbocharger 1 at the same time as the exhaust gas control valve 8 is operated to exhaust gas flow to the LP turbocharger 2 to bypass the HP turbocharger 1. This is described in more detail below.

In FIG. 1, the exhaust control valve 8 is represented in schematic cross-section. The valve 8 is shown in detail in FIG. 2 and comprises a valve rotor 21 having a main body 22 and end stub shafts 23 the valve rotor 1 rotates about the central longitudinal axis X within a substantially cylindrical valve chamber 24 (shown in detail FIGS. 4 and 5) defined within the LP turbine housing 9 at the junction of a passage that leads to the LP turbine inlet 13, the primary exhaust gas flow path 10 from the HP turbine 4, and the bypass flow paths 11, 12 from the exhaust manifold 3. The axis X extends generally transverse to the flow paths 10, 11 and 12. The main body 22 of the valve rotor 21 is formed as a cut-away cylinder, the cut out portion defining a valve passage 25 in the valve chamber 24. The radially outer surface 26 of the rotor forms an arc of a cylinder so as to rotate freely within the cylindrical valve chamber 24. This general form of valve is sometimes referred to as a rotary plug valve or barrel valve.

Figure 2:
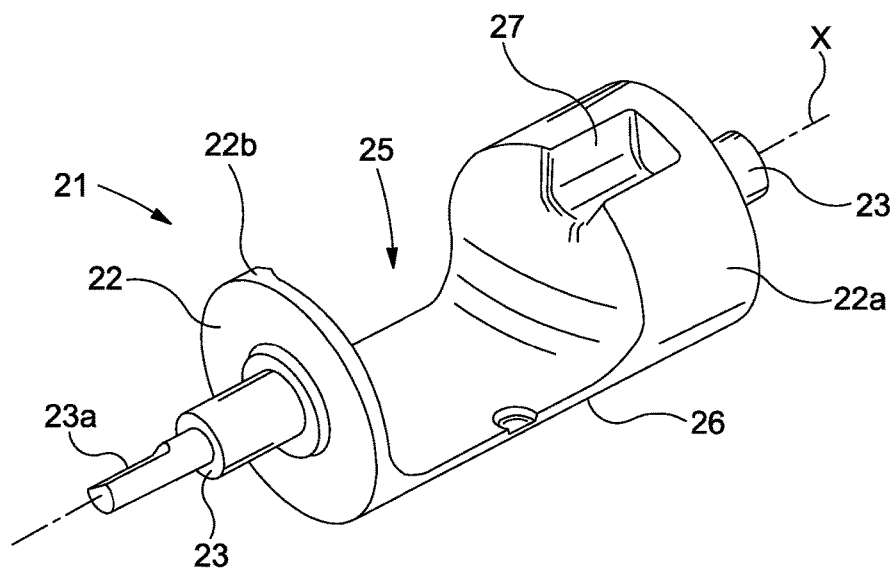
FIG. 2 is a perspective illustration of a valve rotor according to an embodiment of the present invention.

One end of one of the stub shafts 23 has a reduced diameter with a flat 23a for coupling to a suitable actuator (not shown in FIG. 2). The cut out valve passage 25 is offset in the axial direction along the main body 22 leaving cylindrical portions 22a and 22b at each end. The portion 22a is relatively thick and has a groove 27 in its outer surface that is in flow communication with the valve passage 25 and can be considered as an extension to that passage.

Rotation of the valve rotor 21 about the axis X rotates the valve passage 25 and brings the rotor outer surface 26 into alignment with valve ports of the paths 10, 11 and 12 respectively to block partially or completely the flow through the respective port/path. The rotation of the valve rotor 21 effectively rotates the valve passage 25 or the groove 27 into register with the ports to permit exhaust gas flow through the valve chamber 24 along, one or more of the exhaust flow paths 10, 11 and 12, or to completely block the flow through the valve chamber 24.

Appropriate bearing arrangements (not shown) for mounting of the valve rotor 21 within the valve chamber 24, and appropriate valve actuating mechanisms (not shown), will be known to the skilled person. For instance the actuator may be an electric actuator, such as for example a stepper motor or other rotary electric actuator, or may comprise a pneumatic or hydraulic actuator or any other form of actuator. An actuator may be directly connected to one of the valve rotor stub shafts 23, or to a valve rotor spindle (not shown) which may extend from one of the shafts. The actuator may be directly connected to the rotor or connected to the rotor via a gear box or the like. Various possible coupling arrangements will be apparent to the appropriately skilled person.

The movement and positioning of the valve rotor will typically be controlled by the ECU, according to one or more control regimes. For instance, the position of the valve may be controlled in response to engine speed and/or load, the speed of the HP and/or LP turbines, or the boost pressure produced at the engine inlet manifold by the turbocharger system.

Exemplary modes of operation of the turbocharging system including the exhaust gas control valve 8 are described below with reference to FIGS. 3a to 3e. In these figures the valve rotor 21 and valve chamber 24 are shown schematically in cross-section profile. The valve chamber 24 has four ports, a single inlet port 30 and three outlet ports 31, 32, 33. The inlet port communicates with the engine exhaust manifold 3. A first outlet port 31 is in communication with the primary exhaust gas flow path 10 upstream of the HP turbine 4. A second outlet port 32 communicates with the first bypass path 11 downstream of the HP turbine 4 but upstream of the LP turbine 6. A third outlet port 33 is axially offset from the first two (and is therefore represented in dotted line) and communicates with the second bypass path 12 downstream of the LP turbine 6.

Figure 3A:
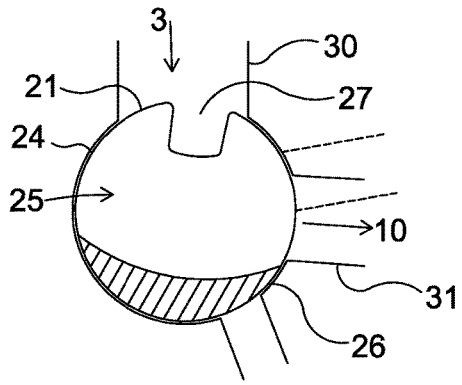
FIGS. 3a-3e are schematic cross-sections through an exhaust gas control valve of the two-stage turbocharging system of FIG. 1, showing the valve of FIG. 2 in different positions for different modes of operation of the system.

Referring first to FIG. 3a this illustrates a position of the valve rotor 21 and the valve passage 25 appropriate for exhaust flow control at low engine speeds and/or loads when there is low exhaust mass flow. The second and third outlet ports (for the first and second bypass exhaust gas flow paths) 32, 33 are closed by the outer surface 26 of the valve rotor 21 so that all of the exhaust gas flow from the engine manifold 3 flows along the primary exhaust gas flow path 10 to the inlet of the HP turbine 4 and then through the LP turbine. The air flow bypass valve 17 will also be closed, or substantially closed, to force air flow through the HP compressor 5 (in practice it is beneficial to close the compressor bypass valve 17 before the turbine bypass is closed to provide load on the HP compressor 5 which will prevent HP turbocharger overspeed as the turbine bypass is closed). The relatively small size of the HP turbine 4 means that the gas flowing through it reaches a relatively high speed and thus rotates the turbine 4 (and consequentially HP compressor 5) at a relatively high speed, thereby producing substantial boost pressure despite a relatively low exhaust mass flow rate. The relatively large size the LP turbine 6 means that it rotates very little so that the LP compressor 7 produces only marginal boost.

With the valve rotor 21 in the position shown in FIG. 3a, the division of work between the HP and the LP turbines 4, 6 is a function of the relative flow areas of each turbine. The HP turbine 4 is providing the majority of the work and operating at a much higher expansion ratio than the larger LP turbine 6. If engine speed and/or load increases with the valve rotor in the portion shown in FIG. 3a, the expansion ratio of both turbines will increase, but the HP turbocharger 1 will continue to provide most of the boost pressure (provided its effective expansion ratio limit is not exceeded).

Figure 3B:
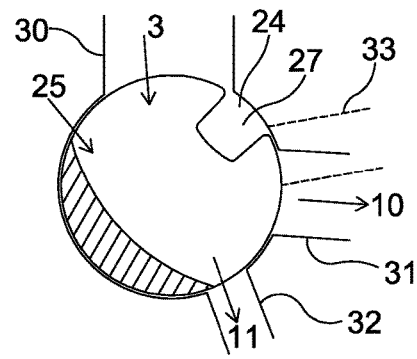

As the engine speed and/or load increases, the valve rotor 21 may be rotated to uncover part, or all, of the second outlet port 32 for the first bypass exhaust gas path 11 to permit at least a portion of the exhaust gas flow to bypass the HP turbine 4. FIG. 3b illustrates the valve rotor rotated to a position in which the second outlet port 32 of the exhaust bypass gas path 11 almost completely uncovered but the third outlet port 33 for the second exhaust bypass gas path 12 remains covered. By controlling the position of the valve rotor 21 between the two extremes (port 32 fully closed as shown in FIG. 3a and fully open in which the rotor is rotated slightly clockwise compared to the position shown in FIG. 3b), it is possible in accordance with the present invention to modulate the bypass gas flow through the bypass gas path 11. For instance, as the engine speed begins to rise from a low speed and/or load condition, the valve rotor 21 may be rotated to begin to open the second outlet port 32 to permit some exhaust gas flow to bypass the HP turbine 4 so that an increasing amount of work is done by the LP turbocharger 2 as the engine speed and/or load rises.

The precise position of the valve rotor 21 may be controlled in accordance with a variety of different operating control strategies. For example, the valve 8 may be operated to maintain a particular expansion ratio across the HP turbine 4, either to maintain the HP turbine 4 at a constant expansion ratio or at an expansion ratio within an acceptable range for particular operating conditions of the engine. The valve 8 could alternatively or additionally be operated in order to maintain the HP turbine speed within a certain range, or below a certain maximum to prevent over-speed. According to another possible control strategy, the valve 8 could be operated to generate a desired boost pressure at the engine intake manifold or to maintain the boost pressure within a desired range (e.g. above a minimum and/or below a maximum). The provision of appropriate sensors, such as turbocharger speed or boost pressure sensors, to provide appropriate control signals to the ECU will be straightforward as will be appreciated by the appropriately skilled person. The sensors might typically include sensors for monitoring engine speed and/or load, turbocharger speed, boost pressure produced by each turbocharger, boost pressure generated at the engine intake and back pressure generated within the exhaust flow path upstream of the control valve 8.

As the engine speed and/or load rises and the valve rotor 21 is rotated further towards the position shown in FIG. 3b in which the first bypass gas path 11 is fully open, work done by the LP turbocharger 2 relative to the HP turbocharger 1 increases. Depending upon the particular control strategy for the bypass exhaust gas flow modulation, the overall pressure ratio of the turbocharger system may for instance rise or remain constant as the expansion ratio across the larger LP turbine 6 increases.

It will be appreciated that as the second outlet port 32 for the bypass exhaust gas path 11 is opened by rotation of the valve rotor 21, the HP compressor bypass valve 17 may also be opened as an increasing amount of boost is provided by the LP compressor. The overall boost pressure produced by the turbocharging system may rise, or may remain constant, as the bypass exhaust gas path 11 is opened depending upon the particular control regime for the control valve 8 and bypass valve 17.

At high engine load and/or speed, the valve rotor 21 is moved to the position shown in FIG. 3b in which the first bypass exhaust gas path 11 is almost fully open or slightly further clockwise so that it is fully open. The turbocharging system again functions effectively as a single turbocharger system, with virtually all of the work now being done by the larger LP turbocharger 2. At this point the HP compressor bypass valve 17 will typically be fully open to bypass the HP compressor 5. There will, however, still be some exhaust gas flow through the HP turbine 4 as there will be a pressure difference across it determined by the relative sizes of the flow passages 10 and 11. Although this would produce negligible work, it will nevertheless ensure that the HP turbine 4 continues to rotate to help provide a smooth transfer of work with little turbo-lag in the HP turbocharger 1 as engine conditions change and the valve 8 is operated to reduce the bypass flow, transferring compression work back to the HP turbocharger 1.

Figure 3C:
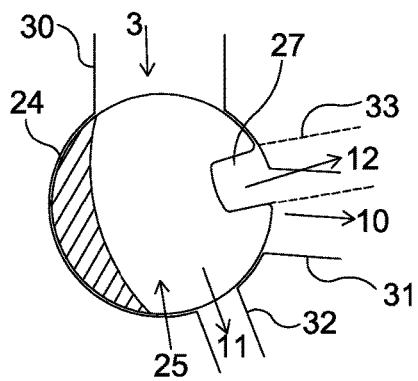

FIG. 3c shows the valve rotor 21 rotated to a position where the first bypass path 11 remains fully open and the groove 27 is aligned with the third outlet port 33 so that the second bypass path 12 is fully opened as well. It will be appreciated that by controlling the precise position of the valve rotor 21 to vary the degree to which the port 33 is uncovered (e.g. between the positions of FIGS. 3b and 3c) the opening of the second bypass path 12 can be controlled as required to limit the work done by the LP turbine 6 and therefore the boost pressure of the LP compressor 7. The second bypass path 12 thus affords a wastegate option in which gas bypasses both turbochargers 1, 2. It will be appreciated from this that the valve rotor 21 may be positioned so as to open the port 33 partially so that the wastegate bypass path 12 does not pass the entire exhaust gas flow, thereby allowing some exhaust gas to flow to the LP turbine 6 to generate boost pressure if required. As with operation of the valve described above in relation to FIGS. 3a and 3b, the position of the valve rotor 21 may be controlled via the ECU in accordance with any appropriate operating regime.

The present invention thus provides a multi-stage turbocharger system including an exhaust gas flow control valve 8 which can be operated precisely to modulate the exhaust gas flow to the HP and LP turbochargers 1, 2 in varied operating conditions, and in accordance with various possible control regimes. The functionality of a HP turbine bypass valve and an LP turbine wastegate are combined into a single control valve. This may be regarded as a normal fired mode operation of the turbocharging system according to the present invention. In accordance with the present invention the turbocharging system may in some embodiments be operated in one or both of two further modes, namely an engine braking mode and an exhaust gas heating mode.

Engine brake systems of various forms are widely fitted to vehicle engine systems, in particular to compression ignition engines (diesel engines) used to power large vehicles such as trucks. The engine brake systems may be employed to enhance the effect of the conventional friction brakes acting on the vehicle wheels or, in some circumstances, may be used independently of the normal wheel braking system, for instance to control down hill speed of a vehicle. With some engine brake systems, the brake is set to activate automatically when the engine throttle is closed (i.e. when the driver lifts his foot from the throttle pedal), and in others the engine brake may require manual activation by the driver, such as depression of a separate brake pedal.

In one form of conventional engine brake system an exhaust valve in the exhaust line is controlled to substantially block the engine exhaust flow when braking is required. This produces an engine braking torque by generating a high backpressure that increases the work done on the engine piston during the exhaust stroke.

Figure 3D:
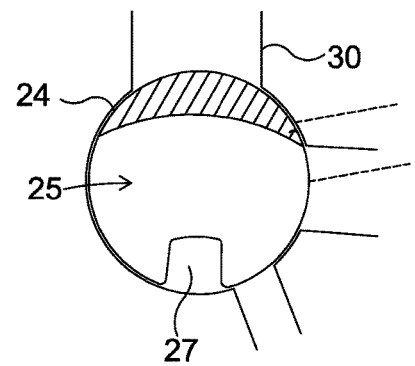

In accordance with an embodiment of the present invention, the exhaust flow control valve 8 can be operated to provide exhaust braking, obviating the need to provide a dedicated exhaust brake valve. When operating the exhaust gas control valve 8 in an engine braking mode in accordance with the present invention, the valve rotor 21 is rotated clockwise to block the port 30 from the engine exhaust manifold 3, and at least partially to block the port 31 that leads to the HP turbine 4 inlet as shown in FIG. 3d. Blocking the inlet to the HP turbine 4 obstructs exhaust gas flow through the turbocharger system thereby generating back pressure for engine braking.

The amount of back pressure generated can be modulated by appropriate control of the position of the valve rotor 21 to vary the degree to which the valve port 30 (and therefore flow to the HP turbine 4) is obstructed. It may be preferable to provide a path for a leakage flow to prevent back pressure exceeding a desired limit. Since in braking mode as illustrated in FIG. 3d the valve rotor 21 completely blocks flow to the inlet to the HP turbine 4, any gas flow through the turbocharger system in the engine braking mode will flow only through the LP turbine. This ensures that there will be reduced boost pressure generated during exhaust braking, and will also ensure that, the HP turbocharger 1 cannot over-speed, bearing in mind that an exhaust brake is often applied when a vehicle is travelling long distances down hill during which there is only light load on the engine but very high engine speeds can be reached. It would also be possible to operate the control valve 8 in an engine braking mode by rotating the rotor 21 in the opposite direction so as to block the second outlet port 32 and at least partially block the port 31 that directs flow to the inlet of the HP turbine 4. However, this is less desirable for braking because of unwanted boost pressure that might be generated by the HP turbine and the potential risk of the HP turbine over speeding.

Whereas the exhaust braking mode is typically a non-fired operating mode (no fuel is supplied to the engine during exhaust braking), the control valve 8 may also be operated to restrict exhaust gas flow in a fired mode (in which fuel is supplied to the engine for combustion) to raise exhaust gas temperature in order to regenerate a catalytic exhaust after-treatment.

Catalytic exhaust after-treatment system performance is directly related to the temperature of the exhaust gas that passes through it. For desired performance the exhaust gas temperature must be above a threshold temperature (typically lying in a range of about 250° C. to 370° C.) under all engine operating conditions and ambient conditions. Operation of the after-treatment system below the threshold temperature range will cause the after-treatment system to build up undesirable accumulations which must be burnt off in a regeneration cycle to allow the after-treatment system to return to designed performance levels. In addition, prolonged operation of the after-treatment system below the threshold temperature without regeneration will disable the after-treatment system and cause the engine to become non-compliant with government exhaust emission regulations.

For the majority of the operation range of a diesel engine for instance, the exhaust gas temperature will generally be above the required threshold temperature. However, in some conditions, such as light load conditions and/or cold ambient temperature conditions, the exhaust gas temperature can often fall below the threshold temperature.

In engine operating conditions, such as light load conditions, in which exhaust temperature might otherwise drop below the required threshold temperature the exhaust control valve can be operated in an exhaust gas heating mode to restrict exhaust gas flow thereby reducing the airflow cooling effect and increasing exhaust gas temperature.

Figure 3E:
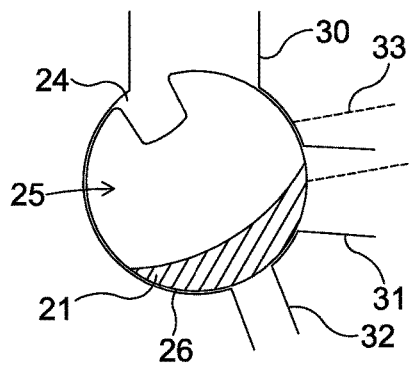

FIG. 3e shows the position of the rotor appropriate to exhaust gas heating, which is a fired operating mode of the engine. Here the rotor 21 is positioned to block significant exhaust gas flow to the HP turbine 4 via the port 31 and to block flow to bypass path 11 to the LP turbine 6 via the outlet port 32. At the same time the compressor bypass valve 17 may be closed so that the incoming air flows through the HP compressor.

The effect of operating the valve in this way is to reduce the gas flow through the engine for any given fuel supply level (whilst maintaining sufficient air flow for combustion) in order to increase the exhaust gas temperature for instance to a level required for efficient operation and regeneration of a catalytic exhaust after-treatment system or for a separate regeneration operation. As mentioned above, this may for example be appropriate in such conditions as light load conditions and/or cold ambient temperature conditions. The heating effect can be modulated by precise control of the valve body 21 to vary the degree of obstruction of the outlet port 31 that leads to the HP turbine inlet.

As with other modes of operation of the exhaust control valve 8, the exhaust gas heating mode of operation of the valve 8 will typically be controlled by the ECU. For instance, the after-treatment system may include a temperature detector for determining the temperature within the system. The temperature detector may directly determine the temperature through a sensor, or may determine the temperature through calculations and/or iterations in an algorithm or software routine. The temperature detector may determine the temperature within the system and provide a signal to the ECU to facilitate control of the exhaust gas control valve 8 to effect a change in the exhaust gas temperature as needed. The temperature determination could be made within the after-treatment system itself, or at other locations such as the outlet of the LP turbine.

The temperature determinations may be made at regular time intervals, for example a plurality of closely timed intervals, or could for instance be effectively continuous. The ECU may be programmed to operate the exhaust control valve 8 in an exhaust gas heating mode whenever the temperature in the exhaust system is determined to have fallen below a threshold temperature.

Figure 4:
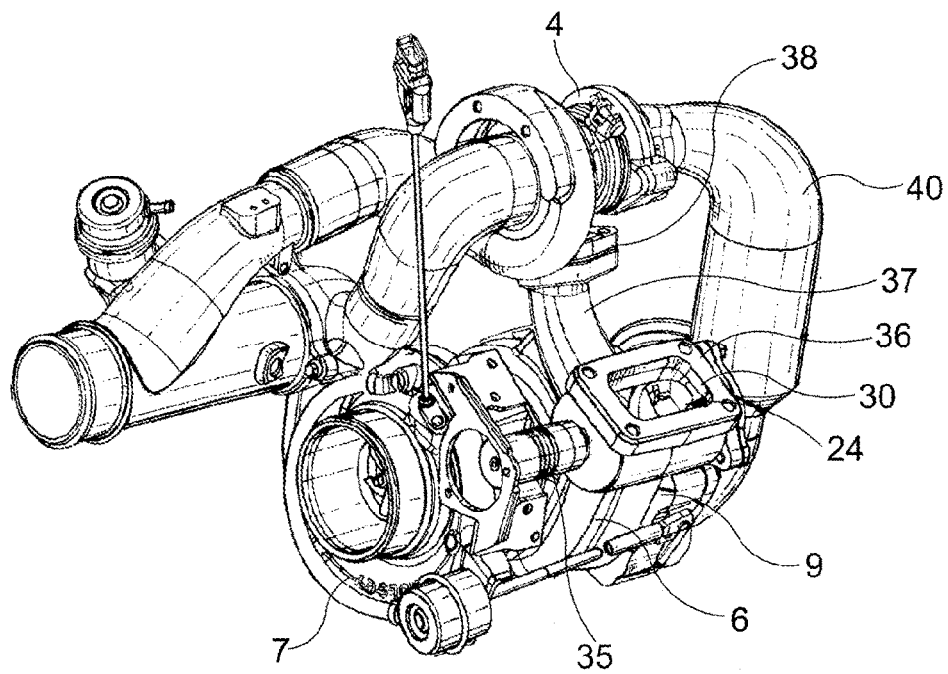
FIG. 4 is a perspective view of the two-stage turbocharging system in accordance with the present invention
Figure 5:
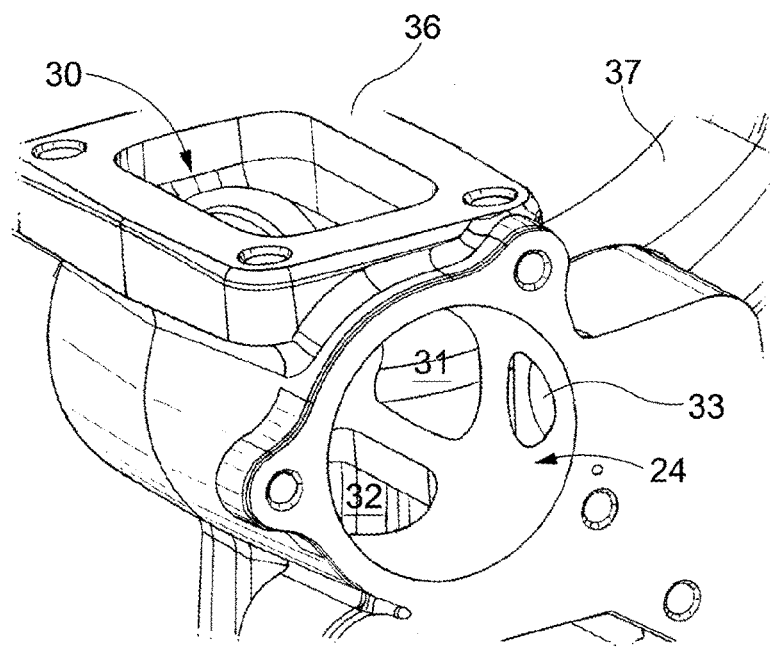
FIG. 5 is a perspective view of part of the system of FIG. 4, illustrating a chamber in which the valve rotor of FIG. 2 is rotatably disposed.

An exemplary embodiment of the interconnected HP and LP turbochargers 1, 2 is shown in FIG. 4. The valve chamber 24, which is shown in more detail in FIG. 5, is integrally formed with a specially adapted LP turbine housing 9 and has an actuator 35 mounted to one side for connection to the valve rotor 21 (which is removed for clarity in FIG. 4). The inlet port 30 that receives exhaust gas from the engine exhaust manifold 3 is shown open and has a flange 36 for connection to a suitable duct (not shown). The HP and LP turbines 4, 6 are interconnected by a duct 37 that extends between the first outlet port 31 and HP turbine inlet port 38 and thus forms part of the primary exhaust gas path 10. The second outlet port 32 is diametrically opposite the inlet port 30 and communicates with the inlet 13 of the LP turbine 6. The third outlet port 33 is disposed alongside the first outlet port 31 but is axially offset therefrom and leads to a wastegate passage 39 defined in the LP turbine housing and forms part of the bypass path 12 that leads to the exhaust gas outlet 14 of the LP turbine. This passage can be seen in the cut-away view of FIGS. 6a and 6b in which the valve rotor 21 is shown in the valve chamber 24. The HP turbine 4 has an exhaust gas outlet that is connected by a duct 40 to the inlet 13 of the LP turbine 6.

Figure 6A:
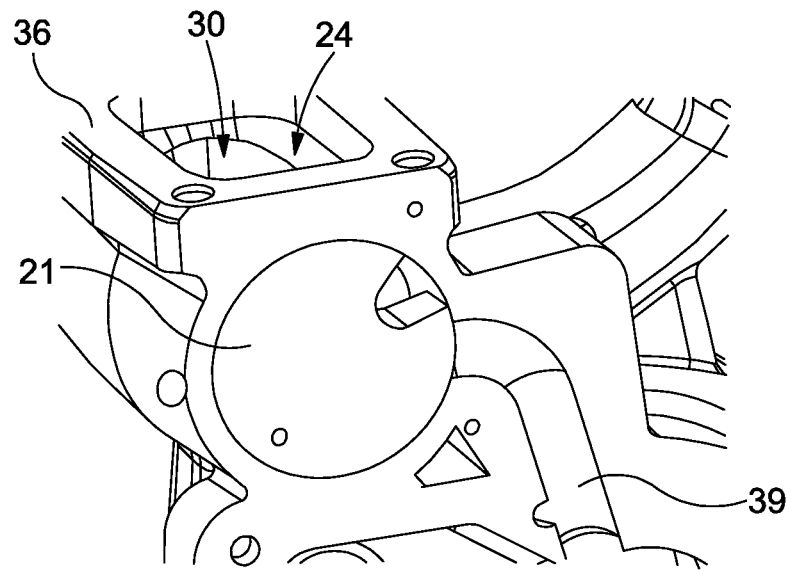
FIGS. 6a and 6b are perspective end views of FIG. 5 with the valve rotor in place and partially cut away to illustrate a wastegate passage, the valve rotor being shown in different positions.
Figure 6B:
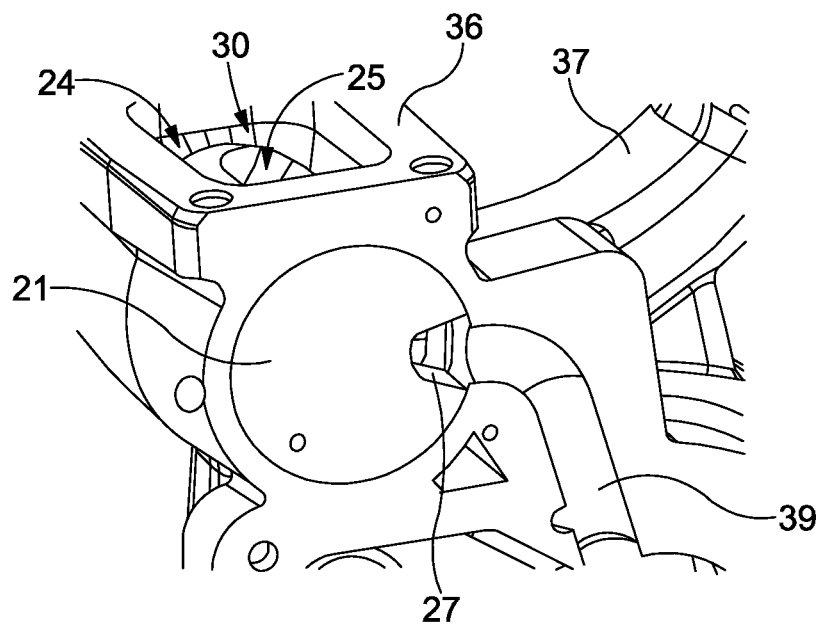

FIGS. 6a and 6b illustrate the rotation of the valve rotor 21 between a first position which corresponds to that of FIG. 3b in which the port 33 that communicates the wastegate passage 39 (forming part of the second bypass path 12) is closed and a second position which corresponds to that of FIG. 3c in which the groove 27 in the valve rotor 21 is aligned with the port 33 so as to open the wastegate passage 39 to the flow of exhaust gas from the inlet port 30, thereby allowing it to bypass the HP and LP turbines 4,6.

Figure 7:
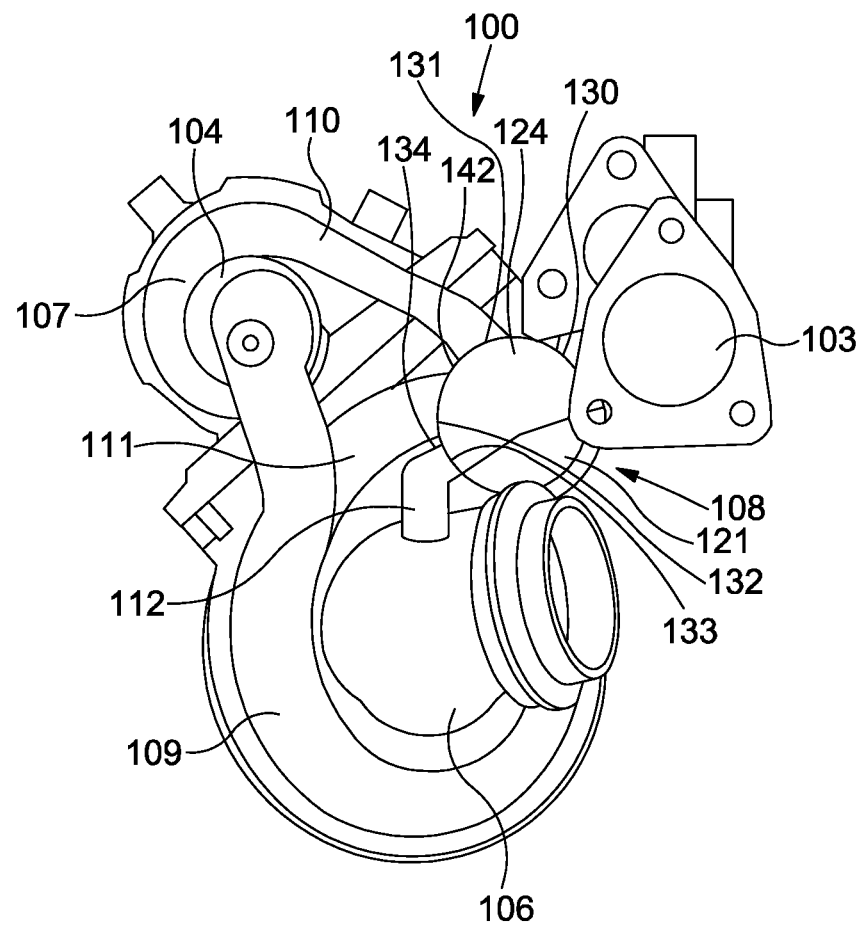
FIG. 7 is a perspective view of a turbocharger system according to an alternative embodiment.

FIG. 7 depicts a turbocharger system 100 according to an alternative embodiment of the invention. The turbocharger system 100 is shown in a partial cut-away view, viewed from the turbine end, in order to best illustrate the embodiment. The embodiment comprises a high pressure (HP) turbine 104 and a low pressure (LP) turbine 106. The turbine wheels of the turbines 104, 106 are not visible, but their locations are readily apparent from the depicted HP turbine housing 107 and LP turbine housing 109. Also shown in FIG. 7 is an exhaust control valve 108 which is configured to control the flow of exhaust gas received from an inlet 103 connected to an exhaust manifold (not depicted). The exhaust control valve 108 comprises a substantially cylindrical valve chamber 124 and a valve rotor 121. The position of the valve rotor 121 within the valve chamber 124 controls the route taken by exhaust gas received by the exhaust control valve 108.

The valve chamber 124 has four ports, a single inlet port 130 and three outlet ports 131-133. The inlet port 130 communicates with the exhaust inlet 103. The first outlet port 131 is in communication with a primary exhaust gas flow path 110 which is connected to the HP turbine 104. The second outlet port 132 communicates with a first bypass path 111 downstream of the HP turbine 104 but upstream of the LP turbine 106 (this port may be referred to as a HP bypass port 132). The third outlet port 133 communicates with a second bypass path 112 downstream of the LP turbine 106 (this port may be referred to as a wastegate 133).

Figure 8:
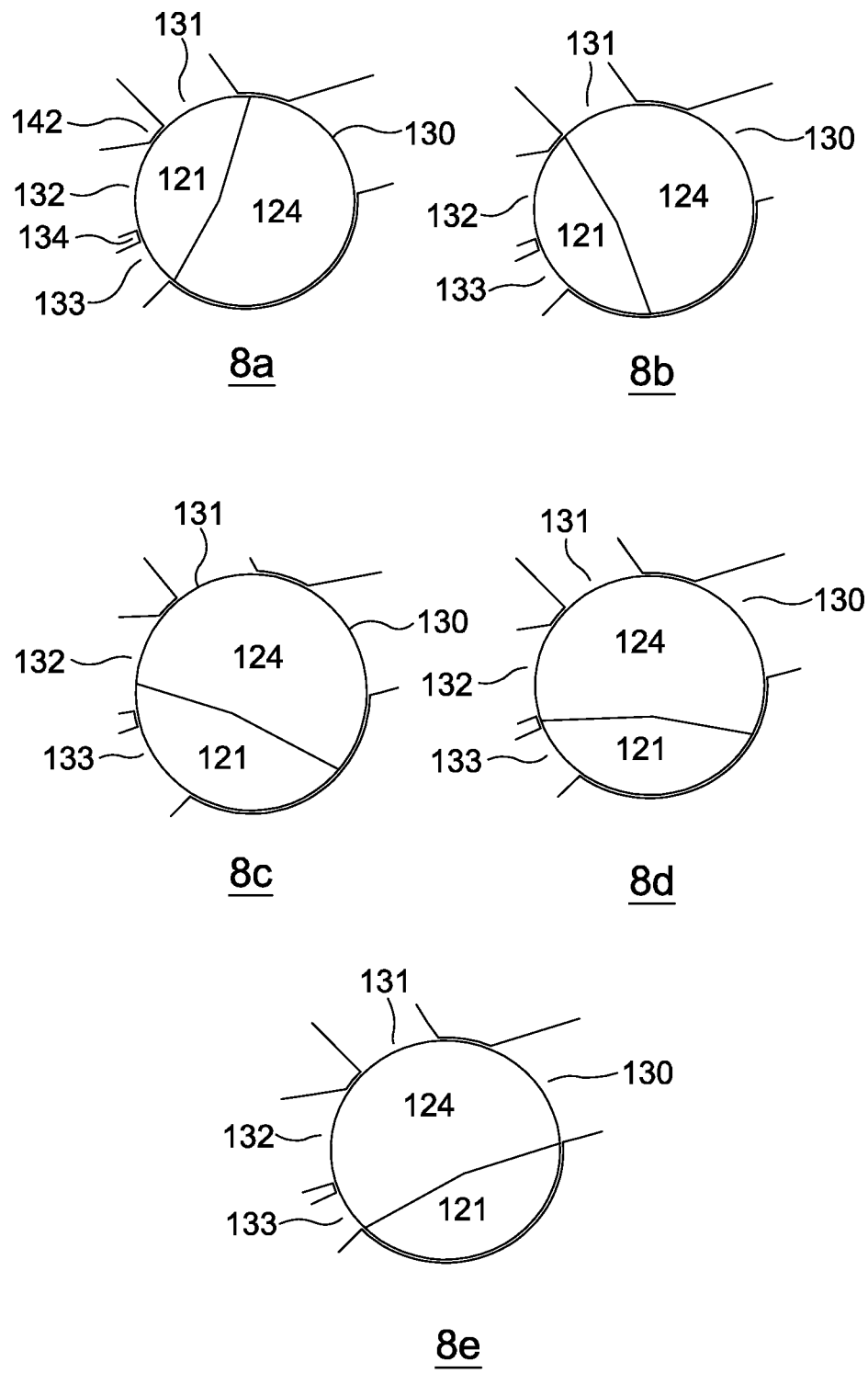
FIGS. 8a-8e are schematic cross-sections through an exhaust gas control valve of the system of FIG. 7 showing the valve of FIG. 7 in various different positions.

FIG. 8 depicts the valve rotor 121 and valve chamber 124 in cross-section, and shows various different positions of the valve rotor. As will be appreciated from FIG. 8, the valve rotor 121 may be moved between various different positions which provide engine braking, modulation between HP and LP turbines, and wastegating in which the HP and LP turbines 104, 106 are bypassed.

FIG. 8a depicts an engine braking mode in which the valve rotor 121 closes all three of the outlet ports 131-133. FIG. 8b depicts a mode in which the first outlet port 131 is open and the other outlet ports 132, 133 are closed. In this mode exhaust is all directed to the HP turbine 104. FIG. 8c depicts a mode in which the first outlet port 131 is fully open and the second outlet port 132 is partially open. In this mode, which may be referred to as a modulation mode, some exhaust gas is directed towards the HP turbine 104 and some exhaust gas bypasses the HP turbine and passes directly to the LP turbine 106. FIG. 8d depicts a mode in which both the first and the second outlet ports 131, 132 are fully open and the third outlet port 133 remains closed. In this mode exhaust gas can flow through both the HP turbine 104 and the LP turbine 106, but in practice flows almost exclusively to the LP turbine because this is a route of less resistance than flowing via the HP turbine. FIG. 8e depicts a mode in which all three outlet ports 131-133 are open. In this mode exhaust gas flows almost exclusively out of the third outlet port 133 (the wastegate) because this is the route of lowest resistance.

Figure 9:
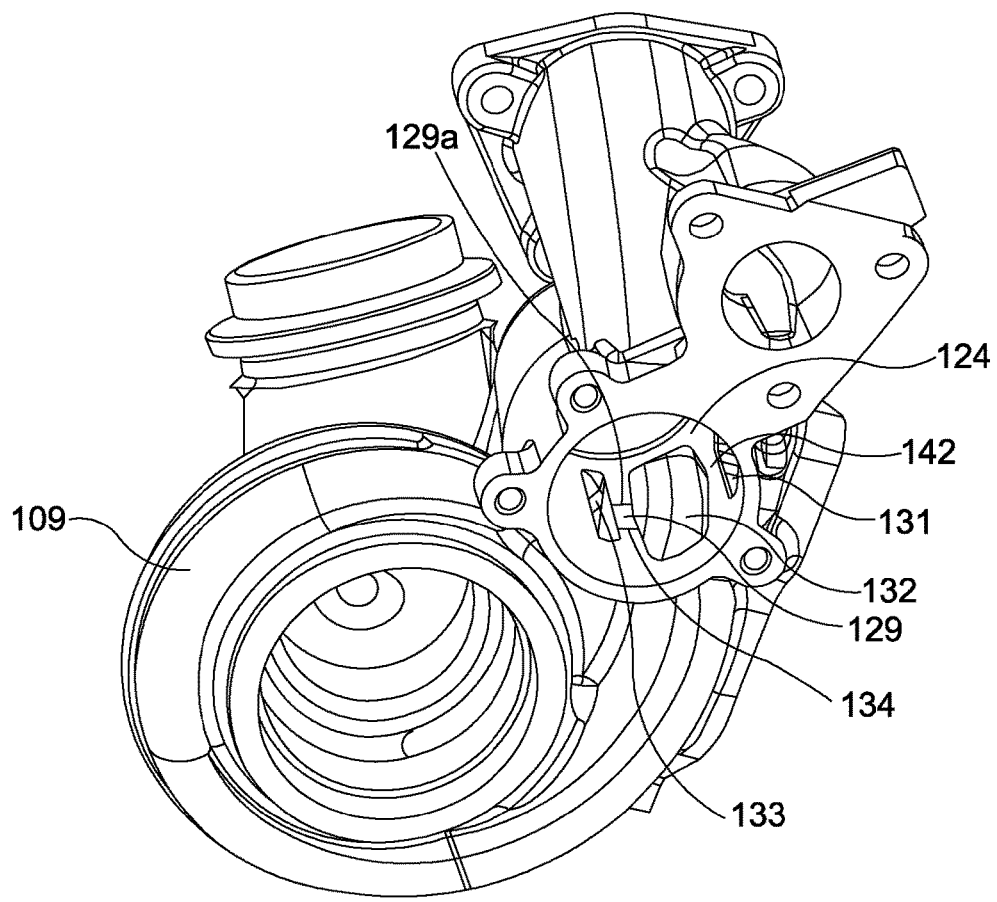
FIG. 9 is perspective view the LP turbine housing of the embodiment depicted in FIG. 7.

FIG. 9 depicts in perspective view the LP turbine housing 109 of the embodiment depicted in FIGS. 7 and 8. The LP turbine housing 109 is viewed from an opposite side compared with FIG. 7 and thus provides a perspective view of the interior of the valve chamber 124. The first outlet port 131, second outlet port 132 and third outlet port 133 are all visible. As can be seen from FIG. 9, there is no separation in the axial direction (i.e. the direction of an axis of the valve rotor) between the outlet ports 131-133. In addition, there is no separation in the axial direction between the inlet port 130 and the outlet ports 131-133. This is in contrast with the embodiment depicted in FIG. 5 in which the third outlet port 33 is axially offset from the inlet port 30 and the first and second outlet ports 31, 32 (see FIG. 5). An advantage which arises from avoiding an axial offset between the inlet port 130 and the third outlet port 133 is that exhaust flowing through the valve 108 is not required to make sharp turns when passing through the valve, thereby avoiding pressure loss and associated back-pressure which would be caused by those sharp turns. This improves engine efficiency by reducing pumping losses via reduction of pressure loss in the turbocharger system 100.

A recess 129 is provided in a wall 134 of the valve chamber 124 which extends between the second outlet port 132 and the third outlet port 133 (the wastegate). The recess 129, which extends between the second outlet port 132 and the third outlet port 133, has a depth of 0.8 mm. A recess depth of at least 0.25 mm may be desirable in order to provide sufficient clearance to accommodate wall deflection (wall deflection is discussed below). The recess 129 may be deeper, for example having a depth of up to 1.5 mm (the recess 129 will provide an exhaust gas leakage path and a depth greater than 1.5 mm may cause an undesirable amount of exhaust gas leakage).

The recess 129 does not extend fully from one end of the valve chamber wall 134 to the other end of the valve chamber wall, but instead is provided at a central portion of the wall. The central portion of the wall 134 may be considered to be a portion which includes a centre point half way between ends of the wall (the ends of the wall being defined with respect to the second outlet port 132). The recess 129 may for example have a length of around 18 mm. A recess length of at least 5 mm may be desirable in order to provide sufficient length to accommodate some wall deflection. The recess 129 may be longer than 18 mm, for example with a length of up to 25 mm (a length greater than this may give rise to an excessive amount of exhaust gas leakage).

The recess 129 allows some deflection of the wall 134 towards the valve rotor 121 to occur during operation of the turbocharger system 100 without the wall 134 coming into contact with the valve rotor. If the wall 134 were to come into contact with the valve rotor 121 then this would liable to prevent the valve rotor from rotating, thereby stopping the turbocharger system 100 from working correctly.

Deflection of the wall 134 towards the valve rotor 121 will occur when the valve rotor covers the third outlet port 133 (the wastegate) whilst the second outlet port 132 (the HP bypass) is open. In this configuration there is a high thermal mass of exhaust gas flowing through the second outlet port 132 but no thermal mass of exhaust gas flowing through the third outlet port 133. As a result, one side of the wall 134 is heated considerably by exhaust gas whereas the other side of the wall is not heated by exhaust gas. This heating of one side of the wall 134 causes it to bend and causes some deflection of the wall radially inwards towards the valve rotor 121. The recess 129 provided in the wall 134 prevents the wall from coming into contact with the valve rotor 121 when this deflection occurs.

Other positions of the valve rotor 121 (and correspondingly other operating modes of the turbocharger system 100) may cause different thermal masses of exhaust to flow through the second and third outlet ports 132, 133 which may also cause bending of the wall 134 due to different amounts of heating on either side of the wall. This may similarly cause deflection of the wall 134 towards the valve rotor 121. Again, the recess 129 acts to prevent the wall 134 from coming into contact with the valve rotor 121.

No recess is provided in the wall 142 which extends between the first outlet port 131 and the second outlet port 132. This is because that wall 142 is thicker than the wall 134 which extends between the second outlet port 132 and the third outlet port 133, and as a result does not suffer from significant deflection during operation of the turbocharger system 100. The relative thicknesses of the walls 134, 142 between the outlet ports 131-133 is most clearly shown in FIGS. 7 and 8, in which it can be seen that the wall 142 between the first and second outlet ports 131, 132 is significantly thicker than the wall 134 between the second and third outlet ports 132, 133.

If the wall 142 between the first outlet port 131 and the second outlet port 132 were thinner such that it suffered from significant deflection, then a recess could be provided in that wall. The form of the recess may correspond with the recess 129 described above. In general, a recess may be provided in any wall between ports, for example if there is a risk of that wall deflecting towards the valve rotor 121 and coming into contact with the valve rotor.

Not providing a recess in the wall 142 between the first and second outlet ports 131, 132 may be advantageous because, where this is the case, when the second outlet port is closed there is no exhaust gas leakage path in that wall to the second outlet port 132. This allows the turbocharger system 100 to be run in a mode in which a small amount of exhaust gas is directed through the first outlet port 131 and back pressure is generated which causes engine heating and allows catalyst regeneration to be performed. If a recess were to be provided in the wall 142 between the first and second outlet ports 131, 132 then it might not be possible to generate enough back pressure to cause sufficient engine heating for catalyst regeneration. The recess 129 in the wall between the second outlet port 132 and the third outlet port 133 does not have a significant effect upon the generation of back pressure in the catalyst regeneration mode because both of these outlet ports are closed by valve rotor 121 when operating in the catalyst regeneration mode.

Figure 10:
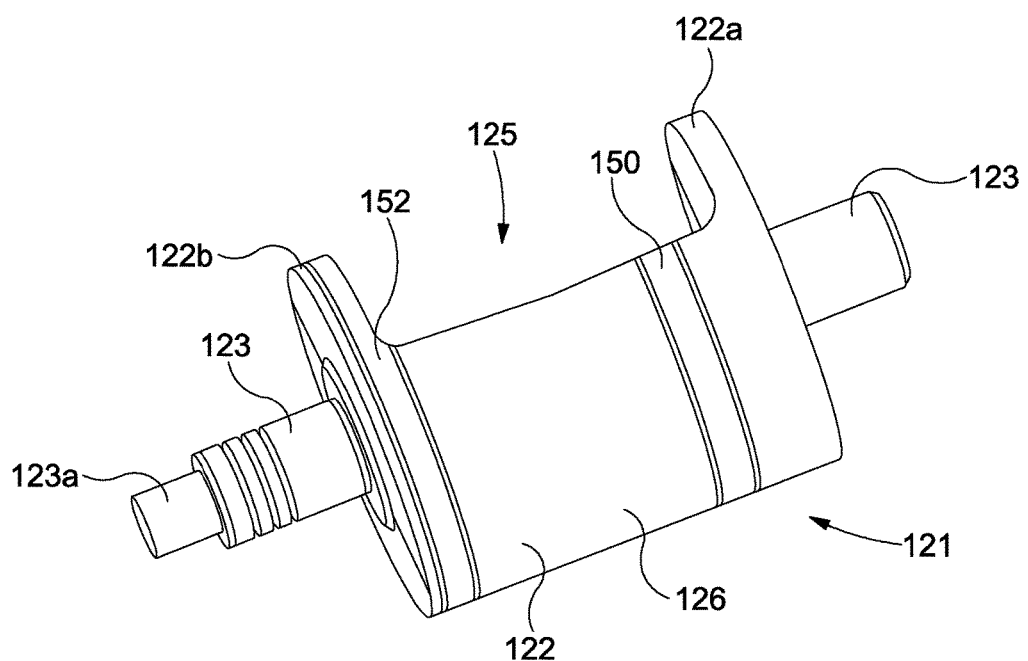
FIG. 10 is a perspective view of an embodiment of the valve rotor of the embodiment depicted in FIG. 7.

FIG. 10 is a perspective view of an embodiment of the valve rotor 121. The valve rotor comprises a main body 122 and end stub shafts 123. The valve rotor 121 rotates about an axis which extends along the center of the main body 122. The main body 122 of the valve rotor 121 is formed as a cut-away cylinder. The cut-out portion defines a valve passage 125 in the valve chamber 124 (see FIGS. 7-9). The cut-out valve passage 125 is offset in the axial direction along the main body 122, leaving cylindrical portions 122a and 122b at each end. A radially outer surface 126 of the rotor 121 generally forms an arc of a cylinder and is able to rotate freely within the cylindrical valve chamber 124. A reduced diameter portion 123a is provided at the end of one of the stub shafts 123. The reduced diameter portion 123a may include a flat (not depicted) for coupling to a suitable actuator (not depicted).

Two recesses extend circumferentially around the radially outer surface 126 of the main body 122. A first recess 150 is axially offset from a first cylindrical portion 122a of the main body 122. A second recess 152 partially overlaps with a second cylindrical portion 122b of the main body 122. The recesses 150, 152 have a depth of 0.18 mm. A recess depth of at least 0.1 mm may be desirable in order to provide sufficient clearance to accommodate some deflection of valve housing material (this deflection is discussed below). The recesses 150, 152 may be deeper, for example having a depth of up to 0.5 mm (the recesses will provide exhaust gas leakage paths and a depth greater than 0.5 mm may cause an undesirable amount of exhaust gas leakage). The recesses 150, 152 may have different depths or may have the same depth. The recesses 150, 152 are 7 mm wide. The recesses 150, 152 may be wider than this, for example with a width of up to 20 mm (recesses wider than this might allow too much exhaust gas leakage). The recesses 150, 152 may be narrower than this, for example with a width of at least 1 mm (recesses narrower than this might not be sufficiently large to accommodate deflected valve housing material). The recesses 150, 152 may have different widths or may have the same width. In general, the recesses 150, 152 may be dimensioned such that they are sufficiently large to accommodate deflected material from the outlet ports 131, 132.

The first and second recesses 150, 152 are axially aligned with ends of the first and second outlet ports 131, 132 (see FIG. 9). Corners of the first and second outlet ports 131, 132 may suffer from thermal fatigue during operation of the turbocharger system 100. Where this is the case cracks will form in the corners of the first and second outlet ports 131, 132. These cracks will deflect valve housing material radially inwardly towards the valve rotor 121. The recesses 150, 152 provide localized clearance which allows radially inward deflection of the housing material to occur without that material coming into contact with the valve rotor 121. Thus, the recesses 150, 152 prevent such material from pressing against the valve rotor 121. This in turn avoids the radially inwardly deflected material stopping or inhibiting rotation of the valve rotor 121.

The wall 134 between the second and third outlet ports 132, 133 does not have a constant thickness but instead tapers towards the central portion of the wall, where the recess 129 is located. A point of maximum deflection of the wall 134 is not located at the middle of the wall 134 but instead is shifted axially inwardly towards one corner 129a of the recess 129. This is because the part of the wall 134 at that end of the recess 129 has a longer unsupported length than the part of the wall at the other end of the recess (the third outlet port 133 extends axially further on one side of the recess than on the other side of the recess). There is a degree of axial overlap between the first recess 150 in the main body 122 of the valve rotor 121 and the recess 129 in the wall 134. This axial overlap allows for deflection of the corner 129a of the recess into the first recess 150. The axial overlap may for example be around 1 mm. Providing a greater axial overlap than this may provide an undesirably large compound leakage path.

As can be seen in FIG. 9, one end of the third outlet port 133 is not aligned with corresponding ends of the first and second outlet ports 131, 132. As will be appreciated from considering FIGS. 9 and 10 in combination, a recess which aligns with that end of the third outlet port 133 is not provided in the valve rotor 121. A recess is not required because there is more material at the third outlet port 133 than at the other outlet ports 131, 132 and this makes it less prone to cracking (the third outlet port heats up and cools down more slowly and therefore is less prone to thermal fatigue).

Although two recesses 150, 152 are depicted in FIG. 10, in an embodiment a single recess may be provided. This may be done for example if more material is provided on one side of the outlet ports 131, 132 such that significant thermal fatigue and resulting cracking will not occur at that side (the recess being provided on the side at which thermal fatigue and cracking will occur).

Edges of the recesses 129, 150, 152 may be cut at a 45° angle. Cutting at a 45° angle is advantageous because it allows standard tooling to be used to cut the recesses. However, the edges may be cut at any other suitable angle. The edges may be straight (when viewed in cross-section). Alternatively, the edges may be curved (although curved edges may be more difficult to cut).

The recesses 129, 150, 152 have a flat bottom surface. This allows easy production of the recesses, and makes measuring the depth of the recesses straightforward. However, the recesses may have any suitable shape.

In an alternative embodiment the recesses may have a scalloped shape. However, the scalloped shape is more difficult and costly to produce, and it may be difficult to ensure accurate location of edges of the recesses.

A recess may be provided in a wall between outlet ports 31, 32 of the valve depicted in FIG. 5. One or more recesses may be provided in the valve rotor depicted in FIG. 2.

The turbocharger system of the present invention may also be operated to assist exhaust gas recirculation (EGR). In an EGR system a portion of the exhaust gas taken from the exhaust manifold is reintroduced into the inlet manifold of the engine for further combustion with a view to reducing engine emissions. An EGR recirculation path allows a portion of the exhaust gas to flow the intake manifold of the engine via an EGR cooler. Flow through the exhaust recirculation path is controlled by an EGR control valve. The EGR control valve may be any one of a variety of conventional types commonly used in such an application, including butterfly valves, flap valves, rotary valves etc.

With modern highly efficient turbocharger systems, the boost pressure of the inlet manifold can often exceed the exhaust gas pressure at the exhaust manifold making the reintroduction of the recirculated exhaust gas to the inlet manifold problematical, for instance requiring dedicated EGR pumps etc. With the present invention, the exhaust gas control valve can be operated in such a way as to effectively reduce turbocharging efficiency below the maximum that could be achieved for any given engine operating condition in order to maintain back pressure at a level necessary to facilitate exhaust gas recirculation. In other words, the exhaust control valve 8 may be operated in such a way as to optimise engine intake and exhaust manifold conditions for exhaust gas recirculation in order to reduce emissions whilst at the same time minimising the air-fuel ratio for better fuel consumption.

The valve is conveniently located in, or adjacent to, the housing of the LP turbine. It will be appreciated that in alternative embodiments of the invention the exhaust flow control valve may be housed in a separate valve housing which is not part of either of the two turbochargers. Such an embodiment would for instance allow retrofitting of the control valve 8 to a two-stage turbocharging system. In other embodiments of the invention, the exhaust flow control valve could for instance be housed within the HP turbine housing. In yet other embodiments, the HP turbine and LP turbines may be combined in a common housing, the exhaust control valve being located within that common turbine housing.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suite varying engine demands. For instance, when the volume of exhaust gas being delivered to the turbine is relatively low, the velocity of the gas reaching the turbine wheel is maintained at a level which ensures efficient turbine operation by reducing the size of the annular inlet passageway. Turbochargers provided with a variable geometry turbine are referred to as variable geometry turbochargers.

In one known type of variable geometry turbine, an axially moveable wall member, defines one wall of the inlet passageway. The position of the member relative to a facing wall of the inlet passageway is adjustable to control the axial width of the inlet passageway. Thus, for example, as gas flow through the turbine decreases, the inlet passageway width may be decreased to maintain gas velocity and optimise turbine output. The variable geometry mechanism of the turbine may incorporate an array of vanes for directing the gas flow to the turbine wheel generally referred to in the art as "nozzle rings". Such vanes may move with the moveable wall member relative to a shroud plate having apertures in which the vanes are received or they may be fixed relative to the turbine housing and the moveable wall member may be in the form of a shroud that moves over the vanes.

Another known type of variable geometry turbine is the "swing vane" type. This comprises a variable guide vane array with adjustable guide vanes located in the turbine inlet passageway. Each vane is pivotable about a respective pivot axis extending across the inlet parallel to the turbine axis. A vane actuating mechanism is provided which is linked to each of the vanes and is displaceable in a manner which causes each of the vanes to move in unison, such a movement enabling the cross-sectional area of the inlet, and also the angle of approach of the gas turbine wheel, to be controlled.

Although two-stage turbocharging systems comprising fixed geometry turbines may in some respects provide an alternative to the use of relatively complex and expensive variable geometry turbochargers, one (or even both) of the turbochargers of a two stage turbocharging system according to the present invention could be a variable geometry turbocharger (of any type). This may be desirable for instance to further improve control over the turbocharging system and the ability to optimise turbocharging performance across a wide range of engine conditions.

In the above described embodiments of the invention there is a single HP turbine. However, it will be appreciated that a turbocharging system according to the present invention could for instance include two parallel HP turbines. For example, each of two HP turbines could receive an exhaust gas flow from a respective bank of cylinders from a multi-cylinder engine (for instance each receiving exhaust gas from one bank of a "V" configured engine).

In embodiments comprising more than one HP turbine, HP turbines can be linked to a common HP compressor or to separate respective HP compressors.

Alternatively, rather than providing two separate HP turbines to receive exhaust gas flow from two separate banks of engine cylinders, a single twin entry HP turbine could be included in a turbocharger system according to the present invention. Moreover, in a turbocharger system according to the present invention comprising one or more HP turbines, each of the HP turbines could be configured as a twin-entry turbine.

Similarly, it will be appreciated that a turbocharging system in accordance with the present invention could have more than one set of sequentially connected turbochargers operating in parallel. For instance, a first turbocharging system generally as described above could receive an exhaust gas flow from a first set of cylinders of a multi-cylinder combustion engine, and a second sequential turbocharging arrangement as described above could receive exhaust gas flow from a second set of cylinders of the engine (each "set" could comprise a single cylinder).

It will further be appreciated that the present invention is not limited to a two-stage sequential turbocharging system, but could be embodied in a turbocharging system comprising more than two turbine stages connected in series.

Other applications and modifications of the invention as described above will be apparent to the appropriately skilled person.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion"

and/or "a portion" is used the item can include a portion and/or the entire item unless specifically stated to the contrary.

What is claimed is:

1. A turbocharger system comprising:
a primary inlet for flow communication with an exhaust gas manifold of an engine and an exhaust outlet;
a first relatively small turbocharger having a first turbine with an inlet and an outlet;
a second relatively large turbocharger having a second turbine with an inlet and an outlet;
a primary exhaust gas flow path including an inlet portion for delivering exhaust gas to the inlet of the first turbine and an intermediate portion for delivering exhaust gas from the outlet of the first turbine to the inlet of the second turbine;
a first bypass flow path in gas flow communication with the primary inlet and the inlet of the second turbine thereby bypassing the first turbine;
a second bypass flow path in gas flow communication with the primary inlet and the exhaust outlet thereby bypassing the second turbine; and
an exhaust gas flow control valve operable to:
  i) permit or prevent selectively exhaust gas flow through the primary exhaust flow path;
  ii) permit or prevent selectively exhaust gas flow through the first bypass path;
  iii) permit or prevent selectively exhaust gas flow through the second bypass path;
wherein the exhaust flow control valve is situated in the inlet portion of the primary exhaust gas flow path so as to permit or allow gas flow through the primary flow path by permitting or allowing gas flow through the inlet portion of the primary flow path;
wherein the exhaust gas flow control valve comprises a primary inlet port communicating with the primary inlet; a primary outlet port communicating with the inlet portion of the primary flow path; a first bypass outlet port communicating with the first bypass path; and a second bypass outlet port communicating with the second bypass path; and
wherein a recess is provided in a wall which extends between two of the outlet ports.

2. The turbocharger of claim 1, wherein the wall extends between the first bypass outlet port and the second bypass outlet port.

3. The turbocharger of claim 1, wherein the recess is provided at a central portion of the wall.

4. The turbocharger of claim 1, wherein the recess has a depth of at least 0.25 mm.

5. The turbocharger of claim 1, wherein the recess has a flat bottom surface.

6. The turbocharger of claim 1, wherein the recess has straight edges cut at an angle.

7. A turbocharger system comprising:
a primary inlet for flow communication with an exhaust gas manifold of an engine and an exhaust outlet;
a first relatively small turbocharger having a first turbine with an inlet and an outlet;
a second relatively large turbocharger having a second turbine with, an inlet and an outlet;
a primary exhaust gas flow path including an inlet portion for delivering exhaust gas to the inlet of the first turbine and an intermediate portion for delivering exhaust gas from the outlet of the first turbine to the inlet of the second turbine;
a first bypass flow path in gas flow communication with the primary inlet and the inlet of the second turbine thereby bypassing the first turbine;
a second bypass flow path in gas flow communication with the primary inlet and the exhaust outlet thereby bypassing the second turbine; and
an exhaust gas flow control valve comprising a valve rotor held in a valve chamber, the exhaust gas flow control valve being operable to:
  i) permit or prevent selectively exhaust gas flow through the primary exhaust flow path;
  ii) permit or prevent selectively exhaust gas flow through the first bypass path;
  iii) permit or prevent selectively exhaust gas flow through the second bypass path;
wherein the exhaust flow control valve is situated in the inlet portion of the primary exhaust gas flow path so as to permit or allow gas flow through the primary flow path by permitting or allowing gas flow through the inlet portion of the primary flow path;
wherein the exhaust gas flow control valve comprises a primary inlet port communicating with the primary inlet; a primary outlet port communicating with the inlet portion of the primary flow path; a first bypass outlet port communicating with the first bypass path; and a second bypass outlet port communicating with the second bypass path; and
wherein the valve rotor is provided with a recess which extends circumferentially around a radially outer surface of the valve rotor, the recess being aligned with an end of at least one of the outlet ports.

8. The turbocharger system of claim 7, wherein the valve rotor is provided with a second recess which extends circumferentially around a radially outer surface of the valve rotor, the second recess being aligned with an opposite end of the at least one of the outlet ports.

9. The turbocharger system of claim 8, wherein the recesses in the valve rotor are aligned with ends of the primary outlet port.

10. The turbocharger system of claim 8, wherein the recesses in the valve rotor are aligned with ends of the first bypass outlet port.

11. The turbocharger system of claim 7, wherein the recess has a depth of at least 0.1 mm.

12. The turbocharger system of claim 7, wherein the recess has a width of at least 1 mm.

13. The turbocharger system of claim 8, wherein one of the recesses is axially offset from a first cylindrical portion of the valve rotor.

14. The turbocharger system of claim 8, wherein one of the recesses partially overlaps with a second cylindrical portion of the valve rotor.

15. The turbocharger system of claim 8, wherein one of the recesses axially overlaps with a recess provided in a wall which extends between two of the outlet ports.

16. A turbocharger system comprising:
a primary inlet for flow communication with an exhaust gas manifold of an engine and an exhaust outlet;
a first relatively small turbocharger having a first turbine with an inlet and an outlet;
a second relatively large turbocharger having a second turbine with an inlet and an outlet;
a primary exhaust gas flow path including an inlet portion for delivering exhaust gas to the inlet of the first turbine and an intermediate portion for delivering exhaust gas from the outlet of the first turbine to the inlet of the second turbine;

a first bypass flow path in gas flow communication with the primary inlet and the inlet of the second turbine thereby bypassing the first turbine;

a second bypass flow path in gas flow communication with the primary inlet and the exhaust outlet thereby bypassing the second turbine; and an exhaust gas flow control valve operable to:

i) permit or prevent selectively exhaust gas flow through the primary exhaust flow path;

ii) permit or prevent selectively exhaust gas flow through the first bypass path;

iii) permit or prevent selectively exhaust gas flow through the second bypass path;

wherein the exhaust flow control valve is situated in the inlet portion of the primary exhaust gas flow path so as to permit or allow gas flow through the primary exhaust gas flow path by permitting or allowing gas flow through the inlet portion of the primary exhaust gas flow path;

wherein the exhaust gas flow control valve comprises a primary inlet port communicating with the primary inlet; a primary outlet port communicating with the inlet portion of the primary flow path; a first bypass outlet port communicating with the first bypass path; and a second bypass outlet port communicating with the second bypass path; and wherein there is no separation in the axial direction between the inlet port, the primary outlet port, first bypass port and the second bypass port;

wherein the exhaust gas flow control valve is selectively operable in each of the following states:

(i) a first state to permit flow through the primary outlet, ort but block flow through the first and second bypass outlet ports;

(ii) a second state to permit flow through the primary outlet port and the first bypass outlet port but block flow through the second bypass outlet port, to allow at least a portion of exhaust gas flow to bypass the first turbine alone;

(iii) a third state to permit flow through said first bypass outlet port and said second bypass outlet port to allow at least a portion of the exhaust gas flow to bypass both the first and second turbines;

(iv) a fourth state to block flow through each of the primary outlet port, first bypass port and second bypass port; and (v) a fifth state to block flow through the first and second bypass outlet ports and to partially block flow through the primary outlet port.

\* \* \* \* \*